(12) United States Patent
McPhee

(10) Patent No.: US 9,185,070 B2
(45) Date of Patent: Nov. 10, 2015

(54) MANET WITH DNS DATABASE RESOURCE MANAGEMENT AND RELATED METHODS

(75) Inventor: Michael Joseph McPhee, Victor, NY (US)

(73) Assignee: HARRIS CORPORATION, Melbourne, FL (US)

( * ) Notice: Subject to any disclaimer, the term of this patent is extended or adjusted under 35 U.S.C. 154(b) by 828 days.

(21) Appl. No.: 13/473,984

(22) Filed: May 17, 2012

(65) Prior Publication Data
US 2013/0311661 A1     Nov. 21, 2013

(51) Int. Cl.
*H04L 29/12*     (2006.01)

(52) U.S. Cl.
CPC ........ *H04L 61/1511* (2013.01); *H04L 61/1552* (2013.01)

(58) Field of Classification Search
CPC ................ H04L 61/1552; H04L 61/1511
See application file for complete search history.

(56) References Cited

U.S. PATENT DOCUMENTS

| | | | |
|---|---|---|---|
| 6,850,532 B2 * | 2/2005 | Thubert et al. | 370/401 |
| 7,280,519 B1 | 10/2007 | Shane | |
| 7,327,683 B2 | 2/2008 | Ogier et al. | |
| 7,519,071 B2 * | 4/2009 | Thubert et al. | 370/401 |
| 7,552,234 B2 * | 6/2009 | Thubert et al. | 709/238 |
| 7,656,879 B2 * | 2/2010 | Riedel et al. | 370/395.21 |
| 7,684,314 B2 * | 3/2010 | Khan et al. | 370/216 |
| 7,743,089 B2 | 6/2010 | Putzolu | |
| 7,774,402 B2 | 8/2010 | Singh et al. | |
| 7,792,989 B2 | 9/2010 | Toebes et al. | |
| 8,051,106 B2 | 11/2011 | Bird | |
| 8,064,368 B1 | 11/2011 | Jones et al. | |
| 8,095,601 B2 | 1/2012 | Hasha et al. | |
| 8,489,701 B2 * | 7/2013 | Manion et al. | 709/217 |
| 8,711,818 B2 * | 4/2014 | Rajappan et al. | 370/338 |

(Continued)

OTHER PUBLICATIONS

"Army networking radios improve communications at tactical edge"; http://www.army.mil/article/68498/Army_networking_radios_improve_communications_at_tactical_edge ; Nov. 2, 2011.*

(Continued)

*Primary Examiner* — Jimmy H Tran
(74) *Attorney, Agent, or Firm* — Allen, Dyer, Doppelt, Milbrath & Gilchrist, P.A.

(57) ABSTRACT

A network includes a first MANET subnet including a first collector node and first client nodes sending first resource status messages to the first collector node. The first collector node maintains a first DNS database based upon the first resource status messages. The network includes a second MANET subnet including a second collector node and second client nodes sending second resource status messages to the second collector node. The second collector node maintains a second DNS database based upon the second resource status messages. The network includes a transit router node sending updates from the first DNS database to the second collector node, and sending updates from the second DNS database to the first collector node. The first and second collector nodes each maintain and synchronize a combined DNS database from the first and second DNS databases, providing resource availability and status throughout the combined network to their respective clients.

18 Claims, 3 Drawing Sheets

(56) References Cited

U.S. PATENT DOCUMENTS

| | | | |
|---|---|---|---|
| 8,825,767 B2* | 9/2014 | Sivakeesar | 709/205 |
| 2002/0062388 A1 | 5/2002 | Ogier et al. | |
| 2003/0153338 A1 | 8/2003 | Herz et al. | |
| 2003/0179742 A1* | 9/2003 | Ogier et al. | 370/351 |
| 2004/0057440 A1* | 3/2004 | Thubert et al. | 370/401 |
| 2004/0202183 A1* | 10/2004 | Thubert et al. | 370/395.31 |
| 2005/0117560 A1* | 6/2005 | Thubert et al. | 370/349 |
| 2008/0123586 A1 | 5/2008 | Manser | |
| 2008/0183853 A1* | 7/2008 | Manion et al. | 709/223 |
| 2009/0109891 A1* | 4/2009 | Fonseca et al. | 370/315 |
| 2010/0142447 A1 | 6/2010 | Schlicht et al. | |
| 2012/0026877 A1* | 2/2012 | Rajappan et al. | 370/235 |
| 2012/0084364 A1* | 4/2012 | Sivakeesar | 709/205 |

OTHER PUBLICATIONS

Baldoni et al., "Structure-less Content-Based Routing in Mobile Ad Hoc Networks," 2005 IEEE, pp. 37-46.

Seaware, "A Publish/Subscribe Middleware for Networked Vehicle Systems," Laboratorio de Sistemas e Tecnologia Subaquatica, Mar. 29, 2006, pp. 1-17 1 1.

Anceaume et al., "Publish/Subscribe Scheme for Mobile Networks," Toulouse, POMC '02, Toulouse, France, Oct. 30-31, 2002, 8 pages.

Gadgil et al., "Planning and Management of Dynamic Publish-Subscribe Communications in Tactical Networks Using Multicast Groups," Telcordia Technologies, Red Bank, New Jersey, Aug. 24, 2007, pp. 1-7.

* cited by examiner

MANET WITH DNS DATABASE RESOURCE MANAGEMENT AND RELATED METHODS

FIELD OF THE INVENTION

The present invention relates to the field of wireless communications, and, more particularly, to mobile ad hoc networks and related methods.

BACKGROUND OF THE INVENTION

Wireless networks have experienced increased development in the past decade. One of the most rapidly developing areas is mobile ad hoc networks (MANETs). Physically, a MANET includes a number of potentially geographically distributed, potentially mobile nodes sharing one or more common radio channels. Compared with other types of networks, such as, cellular networks or satellite networks, MANETs have two distinctive features. First, MANETs lack any fixed infrastructure. Second, each node can act as a router to forward an upstream node's traffic to an ultimate destination, potentially many hops distant. The network is formed of mobile (and potentially stationary) nodes, and is created on the fly as the nodes communicate with each other. The network does not depend on any particular node and dynamically adjusts as some nodes join or others leave the network.

MANETs typically use dynamic routing capabilities. A routing algorithm ensures that data takes an appropriate, and hopefully the fastest, route to a destination node. Some MANETs could include multiple fixed base stations with "cut through" high bandwidth terrestrial links operating as gateways to fixed base stations or other services, including the Internet. It is possible to extend the MANET with only a minimal base station infrastructure. There are also many different types of routing protocols that can be used in a MANET, for example, an Ad hoc On-Demand Distance Vector (AODV), Dynamic Source Routing (DSR), Optimized Link State Routing protocol (OLSR) and Temporally-Ordered Routing Algorithm (TORA).

In more robust networks, nodes may be organized in one or more MANET clusters. For example, nodes in a certain geographic region or echelon may be assigned a cluster, or subnet designation. In some instances, a MANET cluster may include a subnet master node that organizes routing and communications within the cluster. More specifically, the master node may maintain a table having routing paths between other clusters, and current statuses of the nodes within the cluster.

Nevertheless, one drawback to this approach is a node in one cluster may be aware of other services available in the cluster via the master node, but may not be aware of other services in another cluster. In particular, in resource sharing applications, a resource need for a node could be filled by a node in another cluster, but the node may not be aware of such node's services, again because it is in another cluster. Moreover, another drawback to the clustering approach may be that the robustness of the MANET can be substantially altered when the master node is unavailable.

One approach is disclosed in the article titled, "Planning and Management of Dynamic Publish-Subscribe Communications In Tactical Networks Using Multicast Groups," to Gadgil et al. This approach includes assigning multiple publication-subscription topics to each multicast group so that members of each group have similar information and service needs. The approach includes organizing the nodes into a two-tier hierarchy, i.e. including a central planner node and a plurality of dissemination nodes.

In one approach, a non-ad hoc static enterprise communication network is provided and comprises a plurality of permanent, i.e. nailed up, communication conduits. This approach provides current services that are subnet bound, or rely on statically designated proxy (i.e. "Application Level Gateways"). This approach may rely upon wired, stable, high bandwidth, hierarchical network connectivity, and may also rely on network routers and switches to support multicast traffic and static peering mechanisms. This approach may not be robust in a network comprised of MANETs since MANETs are inherently dynamic and typically have less bandwidth available.

SUMMARY OF THE INVENTION

In view of the foregoing background, it is therefore an object of the present invention to provide a network comprised a plurality of subnets including at least one MANET with services that are resilient and robust.

This and other objects, features, and advantages in accordance with the present invention are provided by a network comprising a first mobile ad hoc network (MANET) subnet comprising a first collector node and a first plurality of client nodes configured to send first resource status messages (e.g. Extensible Messaging and Presence Protocol (XMPP) messages) to the first collector node. The first collector node is configured to maintain a first domain name server (DNS) database based upon the first resource status messages. The network includes a second MANET subnet comprising a second collector node and a second plurality of client nodes configured to send second resource status messages to the second collector node. The second collector node is configured to maintain a second DNS database based upon the second resource status messages. The network further includes a transit router (gateway) node configured to send an update from the first DNS database to the second collector node, and to send an update from the second DNS database to the first collector node. The first and second collector nodes are each configured to maintain and synchronize a combined DNS database from the first and second DNS databases, and to inform at least one inquiring node of location and availability of resources based upon the combined DNS database. Advantageously, the first and second collector nodes can redirect resources efficiently in instances where redundant paths or services are offered between subnets.

In some embodiments, each node of the first and second MANET subnets may be configured to duplicate the combined DNS database. Also, at least one other node from the first and second pluralities of client nodes may be configured to maintain and synchronize (e.g. automatically) the combined DNS database when the first collector node or the second collector node is unavailable (e.g. when destroyed or disabled).

Another aspect is directed to a method of operating a network comprising a first MANET subnet comprising a first collector node and a first plurality of client nodes, and a second MANET subnet comprising a second collector node and a second plurality of client nodes. The method comprises sending first resource status messages to the first collector node using the first plurality of client nodes, and maintaining a first DNS database based upon the first resource status messages using the first collector node. The method also includes sending second resource status messages to the second collector node using the second plurality of client nodes, maintaining a second DNS database based upon the second resource status messages using the second collector node, and providing an update from the first DNS database to the second collector node and providing an update from the second DNS database to the first collector node using a transit router node. The method includes maintaining and synchronizing a combined DNS database from the first and second DNS databases, and informing at least one inquiring node of location and availability of resources based upon the combined DNS database using the first and second collector nodes.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
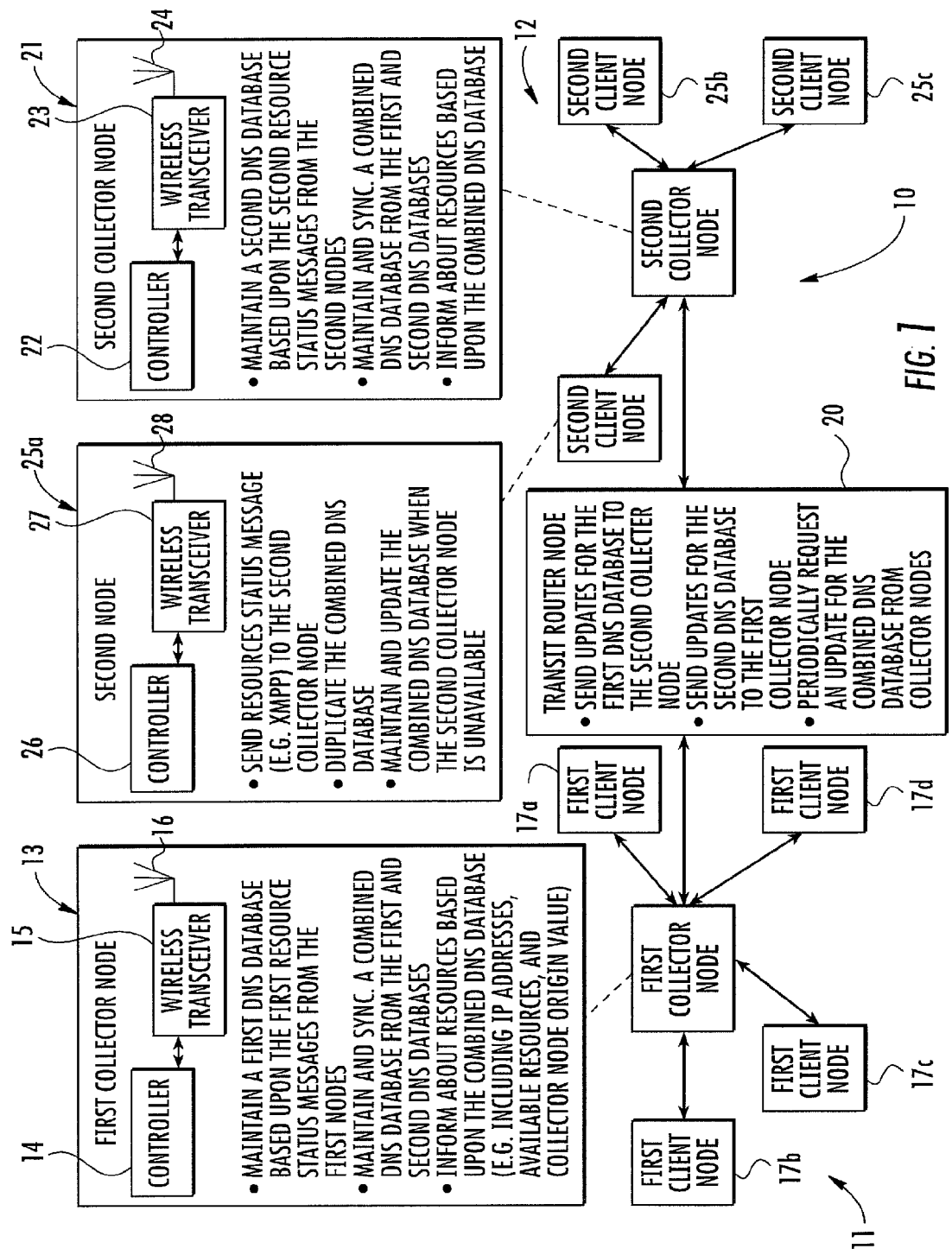
FIG. 1 is a schematic diagram of a MANET, according to the present invention.
Figure 2:
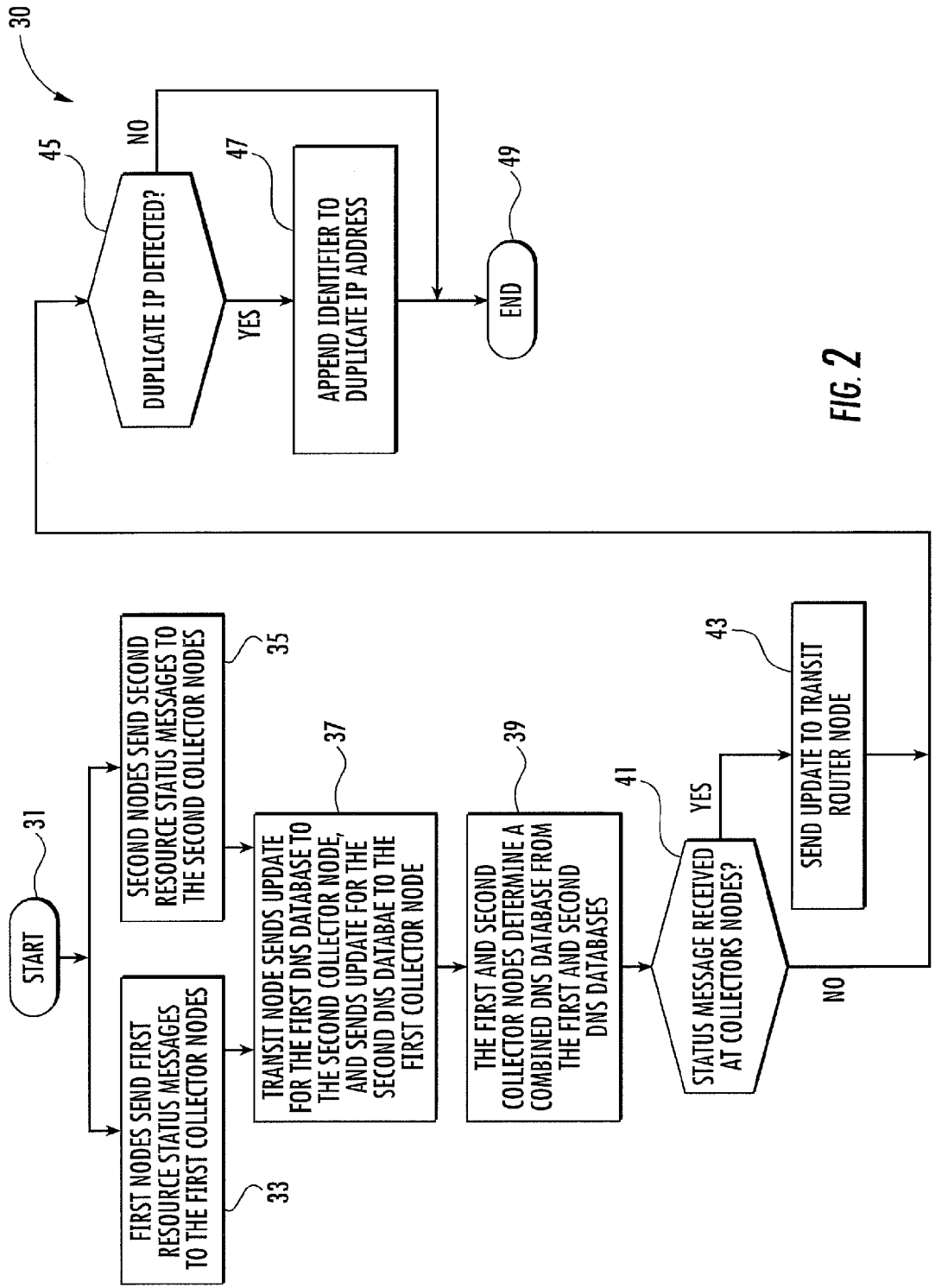
FIG. 2 is a flowchart illustrating operation of the MANET of FIG. 1.

Referring initially to FIGS. 1-2, a network 10 and a method for coordinating services across the network according to the present invention are now described with reference to flowchart 30, which begins at Block 31. The network 10 includes a first MANET subnet 11, and a second MANET subnet 12 communicating therewith. The first MANET subnet 11 includes a first collector node 13, and a first plurality of client nodes 17a-17d configured to send first resource status messages to the first collector node (Block 33). Similarly, the second MANET subnet 12 comprises a second collector node 21, and a second plurality of client nodes 25a-25c configured to send second resource status messages to the second collector node (Block 35).

Each collector node 13, 21 includes a controller 14, 22, a wireless transceiver 15, 23 coupled to the controller, and an antenna 16, 24 coupled thereto. A second client node 25a includes a controller 26, a wireless transceiver 27 coupled to the controller, and an antenna 28 coupled thereto. Additionally, although only one second client node 25a from the second MANET subnet 12 is shown in detail, the other second client nodes 25a-25c and the first client nodes 17a-17d are similarly comprised.

As the first collector node 13 receives first resource status messages in the first MANET subnet 11, the first collector node is configured to maintain and update a first DNS database based upon the first resource status messages. The first DNS database is augmented with fields to represent the services available and required by constituent nodes. Additionally, as the second collector node 21 receives second resource status messages from the second MANET subnet 12, the second collector node also is configured to maintain a second DNS database based upon the second resource status messages, likewise augmented with fields to represent the services available and required by constituent nodes. The resource status messages exchanged in the first and second MANET subnets 11-12 may comprise XMPP messages. In other words, each client node 17a-17d, 25a-25c notifies the respective collector node 13, 21 of its presence and services in the appropriate MANET subnet 11-12.

Each first and second resource status message includes details regarding the respective client node 17a-17d, 25a-25c that transmitted it. In some embodiments, the resource status message includes resource wants and needs of the respective client node, resource availability, operational status of the respective node, and geolocation data of the respective client node 17a-17d, 25a-25c.

The network 10 further includes a transit router node 20 configured to send summary updates from the first DNS database to the second collector node 21, and to send summary updates from the second DNS database to the first collector node 13 (Block 37). The first and second collector nodes 13, 21 are each configured to maintain and synchronize a combined DNS database from the first and second DNS databases, and to inform inquiring nodes of the location of resources based upon the combined DNS database (Block 39). In other words, when a client node in the network 10 has a resource need, it can readily access the combined DNS database at the respective collector node 13, 21 and know if and where the resource is available anywhere in the network.

The combined DNS database includes information related to each client node 17a-17d, 25a-25c in the first and second MANET subnets 11-12. More specifically, the first and second collector nodes 13, 21 store an IP address for each node 17a-17d, 25a-25c in their respective networks, and an associated domain name identifier. In situations where duplicate internal IP addresses are detected amongst nodes 17a-17d, 25a-25c in both MANET subnets 11-12, for example, when the first and second MANET subnets use a same IP address, the first and second collector nodes 13, 21 are configured to append an unique identifier address to the respective IP addresses for unique nodes having overlapping IP addresses (Blocks 45, 47). In particular, the first and second collector nodes 13, 21 may utilize route distinguishers from the border gateway protocol (BGP) for this purpose. In some embodiments, the combined DNS database comprises an extended DNS database.

Additionally, the first and second collector nodes 13, 21 are configured to store a collector node origin value for each client node 17a-17d, 25a-25c in the combined DNS database. Also, the combined DNS database includes resource and capability sources and needs for each client node 17a-17d, 25a-25c in the first and second MANET subnets 11-12, and a subnet network topology for the first and second MANET subnets.

In some embodiments, each client node 17a-17d, 25a-25c of the first and second MANET subnets 11-12 may be configured to duplicate the combined DNS database. Also, at least one other node from the first and second pluralities of client nodes 17a-17d, 25a-25c may be configured to maintain and update the combined DNS database when the first collector node 13 or the second collector node 21 is unavailable (e.g. when destroyed or disabled). For example, each client node 17a-17d, 25a-25c may listen and collect service and role information from the first and second resource status messages being exchanged in the overall network 10.

In other words, the network 10 maintains a capable operational status even when one of the collector nodes 13, 21 is knocked offline for whatever reason. In some embodiments, all or many of the client nodes 17a-17d, 25a-25c are capable as serving as a collector node if needed. Indeed, in these embodiments, the first and second collector nodes 13, 21 are designated based upon determining the best transmit route between the first and second MANET subnets 11-12.

Given the combined database provides each client node 17a-17d, 25a-25c knowledge of the status of the entire network 10, it is helpful to keep the combined database up to date with changes in overall network topology. In particular, the first collector node 13 may be configured to send an update for the combined DNS database to the transit router node 20, and the second collector node 21 may be configured to send an update for the combined DNS database to the transit router node. The scheduling of these updates may be based upon when one of a first resource status message or a first resource status message is received at the respective collector node 13, 21 (Blocks 41, 43). Additionally, the transit router node 20 may be configured to periodically request an update for the combined DNS database from the first and second collector nodes 13, 21 (Block 49). In some embodiments, the updates may be sent based upon when any changes in the network 10 topology are detected, for example, when a node leaves the network.

Another aspect is directed to a method of operating a network 10 comprising a first MANET subnet 11 comprising a first collector node 13 and a first plurality of client nodes 17a-17d, and a second subnet 12 comprising a second collector node 21 and a second plurality of client nodes 25a-25c. The method comprises sending first resource status messages to the first collector node 13 using the first plurality of nodes 17a-17d, and maintaining a first DNS database based upon the first resource status messages using the first collector node. The method also includes sending second resource status messages to the second collector node 21 using the second plurality of client nodes 25a-25c, maintaining a second DNS database based upon the second resource status messages using the second collector node, and sending updates from the first DNS database to the second collector node, and sending updates from the second DNS database to the first collector node 13 using a transit router node. The method includes maintaining a combined DNS database from the first and second DNS databases, and informing inquiring nodes of the location of resources based upon the combined DNS database using the first and second collector nodes 13, 21.

Figure 3:
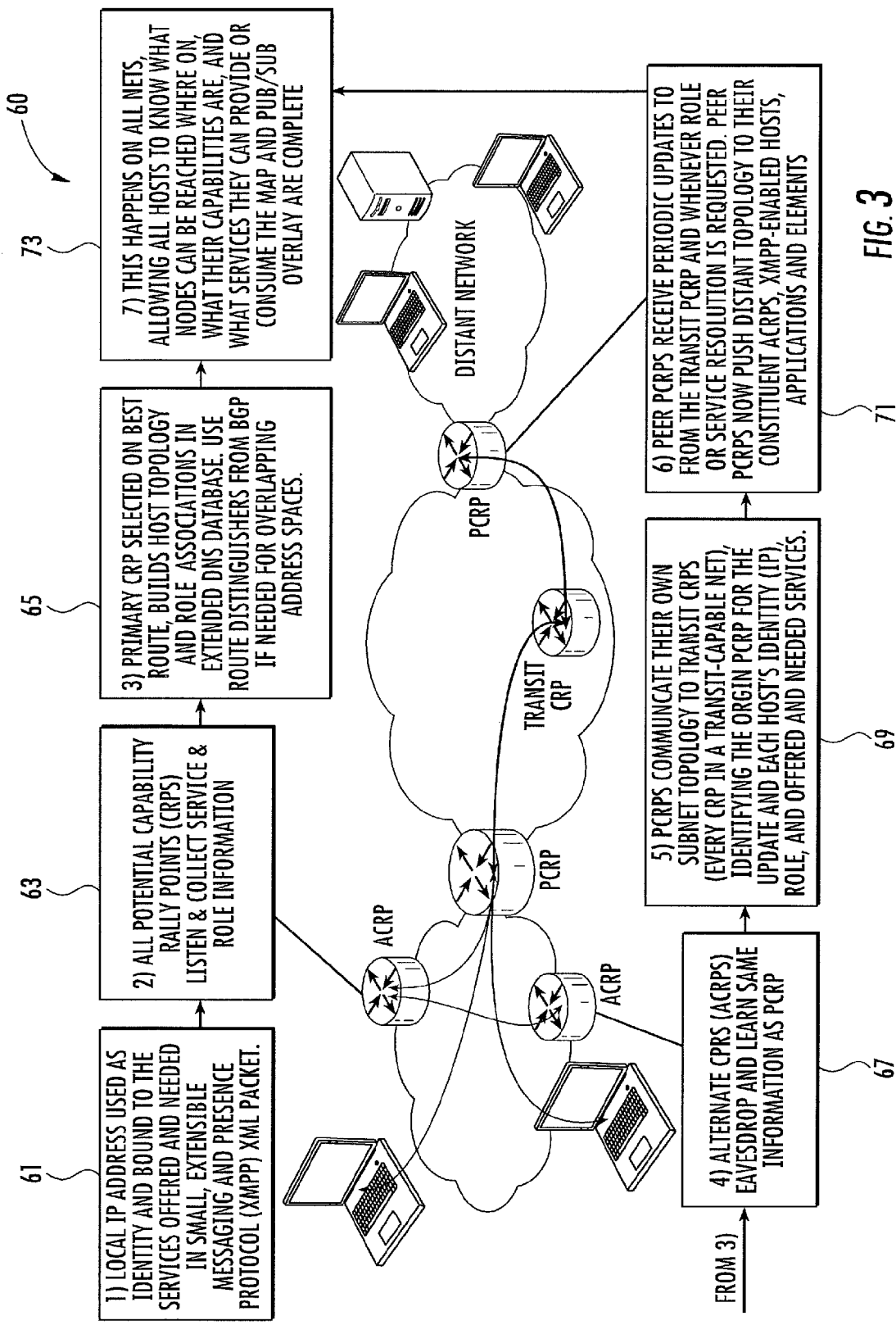
FIG. 3 is a flowchart illustrating operation of an example embodiment of the MANET of FIG. 1.

Referring now to FIG. 3, another flowchart 60 illustrates operation of another embodiment of the network 10 described above. At Block 61, local IP addresses are used to identify and bound services offered and needed in small XMPP packets. At Block 63, all potential capability rally points (CRP) (all nodes 13, 21, 17a-17d, 20, & 25a-25c) listen and collect service and role information. At Block 65, the primary CRP (collector nodes 13, 21) selected on the best route, builds host topology and role associations in an extended DNS database. BGP route distinguishers are used to differentiate overlapping address spaces. At Block 67, the alternate CRPs (ACRPs) (nodes 17a-17d, & 25a-25c) eavesdrop and learn the same information, and at Block 69, the primary CRPs (PCRPs) communicate their own subnet topology to transit CRPs (in transit-capable net embodiments, every CRP) (transit router node 20) identifying the origin PCRP for the update and each host's identity (IP), role, and offered and needed services. At Block 71, peer PCRPs receive periodic updates to and from the transit PCRP and whenever a role or service resolution is requested. Peer PCRPs now can push distant topology to their constituent ACRPs, XMPP-enabled hosts, applications, and elements. At Block 73, this action is expanded to all nets, allowing all hosts to know what nodes can be reached, where on, what their capabilities are, and what services they can provide and consume.

Advantageously, the network 10 may provide a network service and protocol extension that: enables dynamic networks to support internetwork service scopes; and reduces the need for static, single point of failure gateways and proxies. The network 10 also may leverage already required and efficient protocols in a helpful way, i.e. it: piggybacks on XMPP collaboration standards to carry local subnet exchanges of ID, role, and pub/sub; proposes extensions to DNS database to store additional information (ID, role, and pub/sub, origin PCRP); and borrows BGP's use of route distinguisher as method of resolving overlapping IPs (appends 64 bit field to local IP address to identify a specific destination with its representative PCRP).

Moreover, unlike typical approaches, this network 10 may: allow for dynamic topology in the edges and the transit nets, provide survivable election scheme to self-heal, allow reliance on dynamic, auto-discovered relationships rather than static, tedious hand-entry, eliminate at least 75% of manual application configuration in certain applications, and reduce unnecessary traffic by mapping to peers prior to high-rate traffic.

Also, the network 10 may: significantly reduce user workload by simplifying application planning and subsequent manual reconfiguration of networks; shorten communications chain, thereby allowing enabled networks to be larger, more complete; and facilitate faster transit of relevant information; improve survivability; unlike many typical application level gateways (ALG)-based approaches, can heal, morph, & adapt to changes in edge or transit networks; and reduce congestion (trades net-wide broadcasts of high bandwidth media for opportune, low rate updates to encourage more specific routes & quicker discovery).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A network comprising:
 a first mobile ad hoc network (MANET) subnet comprising a first collector node and a first plurality of client nodes configured to send first resource status messages to said first collector node;
 each of said first collector node and said first plurality of client nodes being associated with an Internet Protocol (IP) address and comprising a hardware processor, and a wireless transceiver coupled thereto;
 said first collector node configured to maintain a first domain name server (DNS) database based upon the first resource status messages;
 a second MANET subnet comprising a second collector node and a second plurality of client nodes configured to send second resource status messages to said second collector node;
 each of said second collector node and said second plurality of client nodes being associated with an IP address and comprising a hardware processor, and a wireless transceiver coupled thereto;
 said second collector node configured to maintain a second DNS database based upon the second resource status messages; and
 a transit router node comprising a hardware processor, and a wireless transceiver coupled thereto, and configured to send an update from the first DNS database to said second collector node, and to send an update from the second DNS database to said first collector node;

said first and second collector nodes each configured to
maintain and synchronize a combined DNS database from the first and second DNS databases and with respective IP addresses for each node therein,
append an identifier address to the respective IP addresses for unique nodes having overlapping IP addresses, and to
inform at least one inquiring node of location and availability of resources based upon the combined DNS database.

2. The network of claim 1 wherein each node of said first and second MANET subnets is configured to duplicate the combined DNS database.

3. The network of claim 2 wherein at least one other node from said first and second pluralities of client nodes is configured to maintain and synchronize the combined DNS database when said first collector node or said second collector node is unavailable.

4. The network of claim 1 wherein said first collector node is configured to send the update for the combined DNS database to said transit router node when a first resource status message is received; and wherein said second collector node is configured to send the update for the combined DNS database to said transit router node when a second resource status message is received.

5. The network of claim 1 wherein said transit router node is configured to periodically request the update for the combined DNS database from said first and second collector nodes.

6. The network of claim 1 wherein said first and second collector nodes are configured to store a collector node origin value for each node in the combined DNS database.

7. The network of claim 1 wherein each first client node and each second client node are configured to respectively send the first and second resource status messages comprising Extensible Messaging and Presence Protocol (XMPP) messages.

8. A network comprising:
a first mobile ad hoc network (MANET) subnet comprising a first collector node and a first plurality of client nodes configured to send first resource status Extensible Messaging and Presence Protocol (XMPP) messages to said first collector node;
each of said first collector node and said first plurality of client nodes being associated with an Internet Protocol (IP) address and comprising a hardware processor, and a wireless transceiver coupled thereto;
said first collector node configured to maintain a first domain name server (DNS) database based upon the first resource status XMPP messages;
a second MANET subnet comprising a second collector node and a second plurality of client nodes configured to send second resource status XMPP messages to said second collector node;
each of said second collector node and said second plurality of client nodes being associated with an IP address and comprising a hardware processor, and a wireless transceiver coupled thereto;
said second collector node configured to maintain a second DNS database based upon the second resource status XMPP messages; and
a transit router node comprising a hardware processor, and a wireless transceiver coupled thereto, and configured to send an update from the first DNS database to said second collector node, and to send an update from the second DNS database to said first collector node;
said first and second collector nodes each configured to
maintain and synchronize a combined DNS database from the first and second DNS databases and with respective IP addresses for each node therein,
append an identifier address to the respective IP addresses for unique nodes having overlapping IP addresses, and to
inform at least one inquiring node of location and availability of resources based upon the combined DNS database, each node of said first and second MANET subnets being configured to duplicate the combined DNS database.

9. The network of claim 8 wherein at least one other node from said first and second pluralities of client nodes is configured to maintain and synchronize the combined DNS database when said first collector node or said second collector node is unavailable.

10. The network of claim 8 wherein said first collector node is configured to send the update for the combined DNS database to said transit router node when a first resource status XMPP message is received; and wherein said second collector node is configured to send the update for the combined DNS database to said transit router node when a second resource status XMPP message is received.

11. The network of claim 8 wherein said transit router node is configured to periodically request the update for the combined DNS database from said first and second collector nodes.

12. The network of claim 8 wherein said first and second collector nodes are configured to store a collector node origin value for each client node in the combined DNS database.

13. A method of operating a network including a first mobile ad hoc network (MANET) subnet comprising a first collector node and a first plurality of client nodes, and a second MANET subnet comprising a second collector node and a second plurality of client nodes, the method comprising:
sending first resource status messages to the first collector node using the first plurality of client nodes;
maintaining a first domain name server (DNS) database based upon the first resource status messages using the first collector node;
sending second resource status messages to the second collector node using the second plurality of client nodes;
maintaining a second DNS database based upon the second resource status messages using the second collector node;
providing an update from the first DNS database to the second collector node, and providing an update from the second DNS database to the first collector node using a transit router node; and
maintaining and synchronizing a combined DNS database from the first and second DNS databases and with respective Internet Protocol (IP) addresses for each node therein, appending an identifier address to the respective IP addresses for unique nodes having overlapping IP addresses, and informing at least one inquiring node of location and availability of resources based upon the combined DNS database using the first and second collector nodes.

14. The method of claim 13 further comprising duplicating the combined DNS database with each node of the first and second MANET subnets.

15. The method of claim 14 further comprising maintaining and synchronizing the combined DNS database with at least one other node from the first and second pluralities of client nodes when the first collector node or the second collector node is unavailable.

16. The method of claim 13 further comprising:
sending the update for the combined DNS database from the first collector node to the transit router node when a first resource status message is received; and
sending the update for the combined DNS database from the second collector node to the transit router node when a second resource status message is received.

17. The method of claim 13 further comprising periodically requesting the update from the transit router node for the combined DNS database from the first and second collector nodes.

18. The method of claim 13 further comprising storing a collector node origin value for each client node in the combined DNS database with the first and second collector nodes.

* * * * *